United States Patent [19]
Ogawa et al.

[11] Patent Number: 5,138,846
[45] Date of Patent: Aug. 18, 1992

[54] CONTROL SYSTEM FOR ABSORPTION REFRIGERATOR

[75] Inventors: Atsushi Ogawa; Kazuhiro Hitomi; Masahiro Maekawa, all of Hirakata; Kazuhiro Yoshii; Hidetoshi Arima, both of Ora; Eiichi Enomoto, Saitama, all of Japan

[73] Assignee: Sanyo Electric Co., Ltd., Osaka, Japan

[21] Appl. No.: 737,078

[22] Filed: Jul. 29, 1991

[30] Foreign Application Priority Data

Jul. 30, 1990 [JP] Japan .................. 2-202012

[51] Int. Cl.[5] .................. G06F 1/00; F25B 15/00
[52] U.S. Cl. .................. 62/148; 395/61; 395/900
[58] Field of Search ............ 236/78 D; 395/61, 900; 62/148

[56] References Cited

U.S. PATENT DOCUMENTS 4,454,726  6/1984  Hibino et al. .................. 62/148
5,012,430  4/1991  Sakurai .................. 395/61 X

OTHER PUBLICATIONS

IEEE Journal of Solid-State Circuits, vol. 25, No. 2 Apr. 1990 Watanabe et al pp. 376-382.
Computing and Control Division Colloquium on Real--Time Expert Systems in Process Control J. C. Taunton, 1985.

Primary Examiner—William E. Wayner
Attorney, Agent, or Firm—Armstrong, Nikaido, Marmelstein, Kubovcik & Murray

[57] ABSTRACT

A control system for an absorption refrigerator comprising an evaporator, absorber, generator and condenser for providing a refrigeration cycle. At least one fuzzy rule includes two antecedent input variables and two membership functions for the two input variables. When consequent membership functions of the rules are arranged in a matrix in corresponding relation to the two antecedent membership functions, the consequent membership functions are defined in every other row and every other column of the matrix in a region where at least the two input variables take a positive or negative great value.

8 Claims, 8 Drawing Sheets

DEVIATION OF COLD WATER
OUTLET TEMPERATURE eTo(deg)

FIG. 4

VARIATION IN COLD WATER
OUTLET TEMPERATURE dTo(deg)

FIG. 5

VARIATION IN COLD WATER
INLET TEMPERATURE dTl(deg)

FIG.6

VARIATION IN COOLING WATER
INLET TEMPERATURE  dTci(deg)

FIG.7

VARIATION IN TEMPERATURE OF HIGH
TEMPERATURE GENERATOR  dTg(deg)

FIG.8

AVERAGE OF DEVIATIONS OF COLD
WATER OUTLET TEMPERATURES  e(deg)

FIG.9A

| dTo \ dTg | NB | NS | ZR | PS | PB |
|---|---|---|---|---|---|
| NB |  | ZR |  | NZ |  |
| NS | PS |  | ZR |  | NZ |
| ZR |  | PS |  | ZR |  |
| PS | PM |  | PS |  | ZR |
| PB |  | PM |  | PS |  | eTo = PS

FIG.9B

| dTo \ dTg | NB | NS | ZR | PS | PB |
|---|---|---|---|---|---|
| NB | ZR |  | NZ |  | NS |
| NS |  | ZR |  | NZ |  |
| ZR | PZ |  | ZR |  | NZ |
| PS |  | PZ |  | ZR |  |
| PB | PS |  | PZ |  | ZR | eTo = ZR

FIG.9C

| dTg / dTo | NB | NS | ZR | PS | PB |
|---|---|---|---|---|---|
| NB |  | NS |  | NM |  |
| NS | ZR |  | NS |  | NM |
| ZR |  | ZR |  | NS |  |
| PS | PZ |  | ZR |  | NS |
| PB |  | PZ |  | ZR |  | eTo = NS

FIG.10

| dTo / eTo | NB | NS | ZR | PS | PB |
|---|---|---|---|---|---|
| NB | NB |  | NS |  | NS |
| NS |  | NS | NZ | NZ |  |
| ZR | NM |  | ZR |  | PM |
| PS |  | PZ | PZ | PS |  |
| PB | PS |  | PS |  | PB |

FIG.11

| dTci | NB | NS | ZR | PS | PB |
|------|----|----|----|----|----|
| kQ   | NB | NS | ZR | PS | PB |

FIG.12

| dTi | NB | NS | ZR | PS | PB |
|-----|----|----|----|----|----|
| kQ  | NB | NS | ZR | PS | PB |

FIG.13

| e \ eTo | NB | NS | ZR | PS | PB |
|---------|----|----|----|----|----|
| NB      |    |    | NB |    |    |
| NS      |    |    | NS |    |    |
| ZR      |    |    | ZR |    |    |
| PS      |    |    | PS |    |    |
| PB      |    |    | PB |    |    |

FIG.14

CONTROL SYSTEM FOR ABSORPTION REFRIGERATOR

FIELD OF THE INVENTION

The present invention relates to an absorption refrigerator having a refrigeration cycle which comprises an evaporator, absorption unit, condenser, generator, etc., and more particularly to a system for controlling the cold water outlet temperature of the absorption refrigerator by fuzzy logic control.

BACKGROUND OF THE INVENTION

Generally, PID control systems are used for controlling the cold water outlet temperature of absorption refrigerators. However, observation of the absorption refrigerators provides many items of data including the temperatures at the cold water outlet, cold water inlet, cooling water outlet and cooling water inlet, the temperature of the generator, etc. If all of these items of data are used as input variables for PID control to adjust the degree of opening of the fuel control valve, there arises the problem that the control system becomes extremely complex. The control system further has the problem of being lower in precision of control and responsiveness than when the opening degree of the fuel control valve is manually adjusted by skilled operators based on the heuristic knowledge and with reference to these items of data measured. These problems become more serious in the case of absorption refrigerators having two generators for high and low temperatures.

In recent years, attempts have been made to apply fuzzy logic to automatic control to realize exquisite control comparable to the manual control by skilled operators. For example, U.S. Pat. No. 4,842,342 discloses a system for controlling the operation of motor vehicle brakes by fuzzy logic control.

Accordingly, it appears feasible to control the cold water outlet temperature of absorption refrigerators by fuzzy logic control. The application of fuzzy logic control to absorption refrigerators nevertheless involves the following problem.

In fuzzy logic control, the experience or knowledge quantitatively acquired by skilled operators is expressed in the form of IF (antecedent)-THEN (consequent) to prepare control rules (hereinafter referred to merely as "rules") for use in fuzzy reasoning. In many cases, the antecedents of rules comprise a plurality of input variables. For example, suppose input variables (antecedent variable) is A, B and C, an output variable (consequent variable) is D, and fuzzy variables (membership functions) are represented by five fuzzy labels, i.e., NB (Negative Big), NS (Negative Small), ZR (Zero), PS (Positive Small) and PB (Positive Big). One rule is then expressed as follows.

Rule 1: IF A is PB AND B is ZR AND C is PB, THEN D is ZR.

Accordingly, if the three input variables each have the five fuzzy labels, the total number of rules is $5^3 = 125$. In the case of the control system for an absorption refrigerator having a high temperature generator and a low temperature generator, the number of input variables is at least 5, hence a very large number of rules. If these rules are all to be described to make fuzzy reasoning, the arithmetic operation requires a long period of time, and if the operation time exceeds the control period, control becomes impossible.

A reduction in the number of membership functions decreases the number of rules, whereas rough control will then result.

Further in the fuzzy logic control of absorption refrigerators, it is required to make the cold water outlet temperature free from offset during the stabilized period of control and to effectively inhibit the influence of interferences.

Further in the conventional method of fuzzy logic control, the antecedent membership functions for formulating rules are defined in the range of 0 to 1 in grade, and different input variables exert the same degree of influence on the control input. However, the experience of skilled operators indicates that the degree of influence of the input variable on the controlled input varies from variable to variable. This heuristic knowledge must be utilized in fuzzy logic control.

SUMMARY OF THE INVENTION

An object of the present invention is to provide a system for controlling absorption refrigerators with a reduced period of arithmetic operation time without decreasing the number of membership functions associated with fuzzy reasoning.

Another object of the present invention is to provide a control system for an absorption refrigerator which system comprises:

first arithmetic means for calculating values of a plurality of input variables for forming fuzzy rules based on a plurality of items of measurement data at least including a cold water outlet temperature, a cold water inlet temperature, a cooling water inlet temperature and the temperature of a generator, memory means having stored therein a plurality of fuzzy rules serving as bases for fuzzy reasoning, second arithmetic means for calculating a control input to approximate the cold water outlet temperature to a desired value by performing fuzzy reasoning in accordance with the specified rules stored in the memory means based on the values of input variables supplied form the first arithmetic means, and control means for adjusting the amount of heating of the generator in accordance with the control input delivered from the second arithmetic means as an output, the plurality of rules in the memory means including rules having two antecedent input variables, two membership functions for the two input variables, and consequent membership functions which, when arranged in a matrix in corresponding relation to the two antecedent membership functions, are defined in every other row and every other column of the matrix in a region where at least the two input variables take a positive or negative great value.

With the absorption refrigerator control system described above, the rule matrix defining the consequent membership functions of the rules which include the two antecedent input variables defines the functions in every other row and every other column, so that the total number of rules is one-half of that of rules to be formed when all the elements of the matrix are filled up. This assures a reduced operation time.

Further in the construction of the rule matrix described, the number of rows and the number of columns, that is, the number of antecedent membership functions for the two input variables is not reduced, so that rough control will not result. Even if the input variable takes such a value that the corresponding membership function is not defined in the matrix, an uncontrollable state will not be brought about because the membership functions defined in the matrix are positioned adjacent to each other in the directions of rows and columns, such that when the input variable further slightly varies, an adjacent membership function will serve the purpose.

In the case where one of the input variables of the rules is the deviation of the cold water outlet temperature from a desired value, the consequent membership functions corresponding to the other input variables and defined are arranged in the direction of row or column without an interval therebetween at a region where the above-mentioned one input variable is zero or approximately zero. As the control input approaches zero, these consequent membership functions are defined closely at a smaller interval.

Consequently, in a state wherein the cold water outlet temperature is approximate to the desired value, the matrix is not in a state in which no membership function is defined, with the eventual result that the cold water outlet temperature is adjusted to the desired value with high accuracy.

Another object of the present invention is to provide a system for controlling an absorption refrigerator by fuzzy logic control rules formed by input variables, one of the input variables being the deviation of the cold water outlet temperature from a desired value, another one of the input variables being the average value of deviations of cold water outlet temperatures from the desired value during a specified period in the past, membership functions being defined for the average value of deviations of cold water outlet temperatures during the specified past period on condition that the deviation of cold water outlet temperature is zero or approximately zero.

In the above control system, the membership functions defined for the average value of deviations of cold water outlet temperatures during the specified past period play a role corresponding to the integration operation of PID control, leaving no offset in the cold water outlet temperature during a stabilized period of control. Membership functions are defined for the cold water outlet temperature to serve a function corresponding to the proportion operation in PID control, effective-reducing the influence of interferences.

Another object of the invention is to provide a system for controlling an absorption refrigerator wherein antecedent membership functions for one or a plurality of input variables for forming fuzzy rules are weighted according to the degree of influence by the variable on the control input obtained.

With this control system, based on the experience or heuristic knowledge of skilled operators, a weight of less than 1 (e.g., 0.4) is given to the antecedent membership function for an input variable, such as the cooling water outlet temperature variation, which is small in the degree of influence on the control input. This realizes control as exquisite as is effected by skilled operators.

DETAILED DESCRIPTION OF EMBODIMENT

An embodiment of the present invention will be described below with reference to the drawings.

Figure 1:
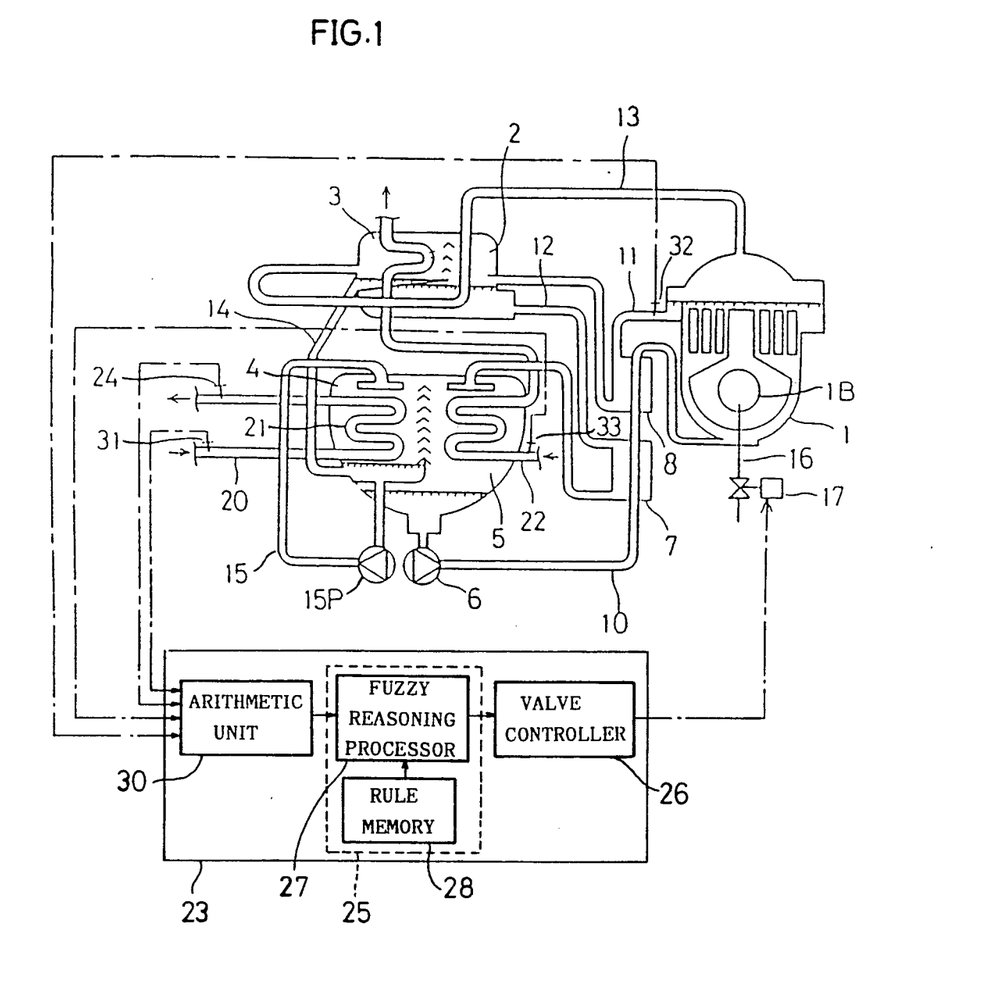
FIG. 1 is a block diagram showing the construction of a system embodying the invention for controlling an absorption refrigerator.

FIG. 1 shows a double-utility absorption refrigerator wherein water is used as a refrigerant and an aqueous solution of lithium bromide (LiBr) as an absorbing solution. The refrigerator comprises a high temperature generator 1 equipped with a burner 1B, low temperature generator 2, condenser 3, evaporator 4, absorber 5, absorbing solution pump 6, low temperature heat exchanger 7, high temperature heat exchanger 8, dilute absorbing solution pipe 10, intermediate absorbing solution pipe 11, concentrated solution pipe 12, refrigerant pipe 13, refrigerant downflow pipe 14 and refrigerant recycling pipe 15 which are connected together as illustrated. A refrigerant pump 15P is provided at an intermediate portion of the refrigerant recycling pipe 15. A fuel supply pipe 16 connected to the burner 1B is provided at an intermediate portion thereof with a fuel control valve (valve for controlling the amount of heating) 17. An evaporator heat exchanger 21 is provided at an intermediate portion of a cold water pipe 20. A cooling water pipe 22 further extends through the absorber 5 and the condenser 3.

A cold water inlet temperature sensor 31 is disposed on an inlet portion of the cold water pipe 20 extending into the evaporator 4. A cold water outlet temperature sensor 24 is disposed on an outlet portion of the pipe 20 extending form the evaporator 4. A temperature sensor 32 for the high temperature generator 1 is provided on the generator 1, and a cooling water inlet temperature sensor 33 is mounted on an inlet portion of the cooling water pipe 22 extending into the absorber 5.

The operation of the above absorption refrigerator is well known and therefore will not be described.

The refrigerator has connected thereto a control panel 23 for controlling the cold water outlet temperature. The control panel 23 has an arithmetic unit 30 to which detection signal are fed from the cold water inlet temperature sensor 31, cold water outlet temperature sensor 24, temperature sensor 32 on the high temperature generator 1 and cooling water inlet temperature sensor 33, a microprocessor 25 for executing fuzzy logic control according to the present invention, and a controller 26 for adjusting the degree of opening of the fuel control valve 17. The microprocessor 25 comprises a fuzzy reasoning processor 27 and a rule memory 28.

The fuzzy reasoning processor 27 calculates the control input kQ to be given to the fuel control valve 17 by a logical operation, and feeds the control input kQ obtained to the controller 26, which in turn adjusts the opening degree of the fuel control valve 17 based on the input kQ.

The rule memory 28 has stored therein fuzzy rules and antecedent and consequent fuzzy variables (membership functions) which are necessary for the fuzzy logical operation to be conducted by the fuzzy reasoning processor 27.

Six input variables for forming the fuzzy rules are set in the present embodiment. These variables are the deviation eTo of the cold water outlet temperature, variation dTo in the cold water outlet temperature, variation dTci in the cooling water inlet temperature, variation dTi in the cold water inlet temperature, average value e of 40 samples in the past of deviations of cold water outlet temperatures, and variation dTg in the temperature of the high temperature generator. These values are calculated from the following equations.

(1) Deviation eTo of cold water outlet temperature $$eTo = \text{current value} - \text{desired value}$$

(2) Variation dTo in cold water outlet temperature $$dTo = \text{current value} - \text{previous value}$$

(3) Variation dTci in cooling water inlet temperature $$dTci = \text{current value} - \text{previous value}$$

(4) Variation dTi in cold water inlet temperature
$$dTi = \text{current value} - \text{previous value}$$

(5) Average value e of 40 samples of deviations of cold water outlet temperatures in the past $$e = \left( \sum_{j=1}^{40} eTo_j \right)/40$$

(6) Variation dTg in temperature of high temperature generator $$dTg = \text{current value} - \text{previous value}$$

The arithmetic unit 30 receives detection signals from the cold water outlet temperature sensor 24, cold water inlet temperature sensor 31, high temperature generator temperature sensor 32 and cooling water inlet temperature sensor 33, for example, with a period of 5 seconds, calculates from these signals the values of deviation eTo of the cold water outlet temperature, variation dTo in the cold water outlet temperature, variation dTci in the cooling water inlet temperature, variation dTi in cold water inlet temperature, average value e of 40 samples of variations of cold water outlet temperatures in the past and variation dTg in the high temperature generator temperature, and feeds the results to the microprocessor 25.

The fuzzy reasoning processor 27 accepts the input variables eTo, dTo, dTci, dTi, e and dTg from the arithmetic unit 30, and with reference to the antecedent membership functions and rules stored in the rule memory 28, calculates the matching degree of the rules. For those of the rules including a plurality of antecedent membership functions, minimum matching degrees are determined among other matching degrees of the membership functions. Thus, so-called "min operation" is conducted.

The antecedent membership functions $\mu$ with respect to the input variables eTo, dTo, dTi, dTci, dTg and e are defined as shown in FIGS. 3 to 8, respectively, using fuzzy labels NB, NS, ZR, PS and PB. With respect to the input variables dTi, dTci and e, the antecedent membership functions are weighted with 0.4, 0.5 and 0.5, respectively, to diminish the influence of the variables on the control input. This realizes control which is as exquisite as is effected by skilled operators.

Figure 9A:
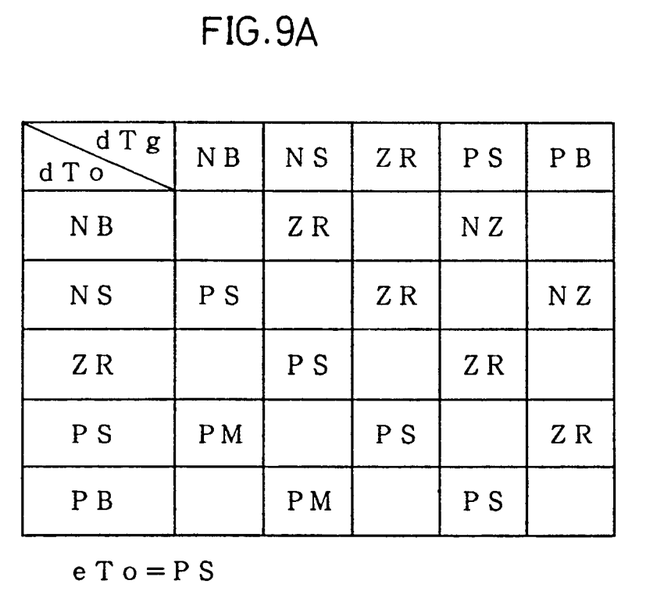
FIGS. 9A, 9B and 9C are diagrams of rule matrixes relating to variations in the temperature of the high temperature generator, variations in the cold water outlet temperature and deviations of cold water outlet temperatures.
Figure 9B:
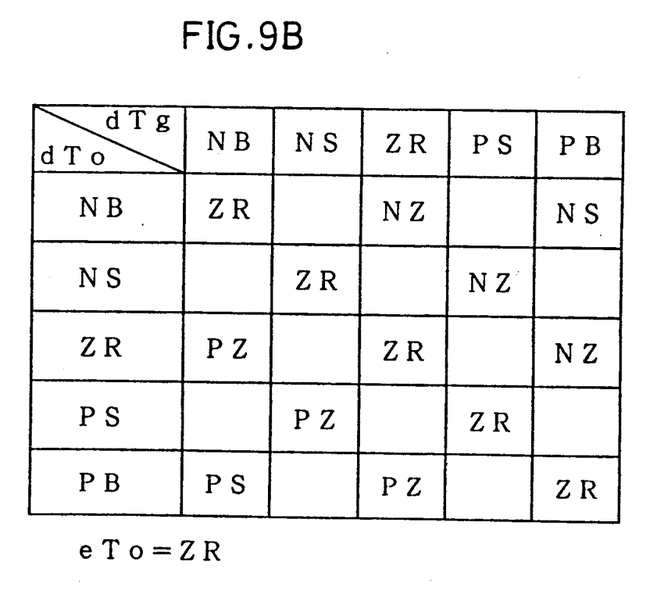
Figure 9C:
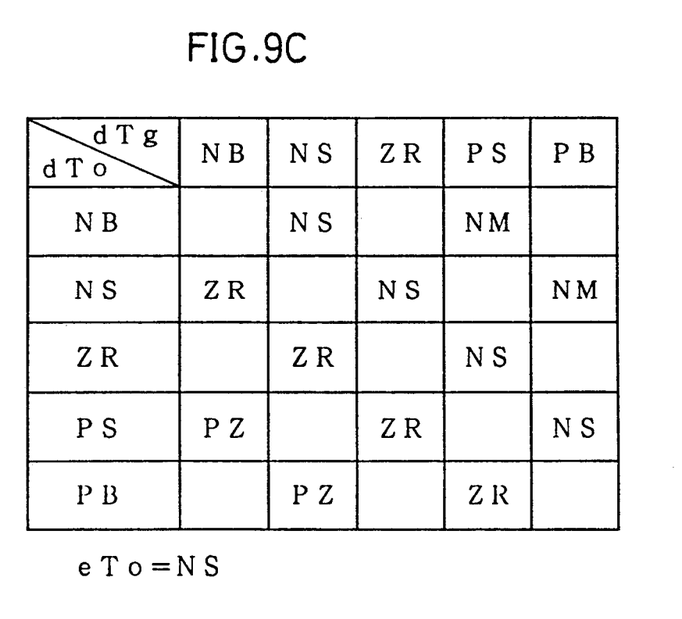

FIGS. 9A, 9B and 9C illustrate rules with respect to the input variables eTo, dTo and dTg. When consequent membership functions of the rules are arranged in matrix in corresponding relation to two antecedent membership functions, the consequent membership functions are defined in every other row and every other column of the matrix as shown.

According to FIG. 9A, for example, the following rule is obtained.

IF dTg is NS AND dTo is ZR AND eTo is PS,
    THEN kQ is PS.

Similarly other combinations of membership functions afford rules, and 37 rules are obtained from FIGS. 9A to 9C.

If consequent membership functions are defined in all the elements of these rule matrixes in the directions of rows and columns as in the prior art, 75 rules will be expressed, whereas the number of rules according to the invention is one-half the number of the prior art. This greatly reduces the operation time for fuzzy reasoning.

Incidentally, there arises a case wherein no membership function is defined in the rule matrix. For example, with reference to FIG. 9, there will be a case wherein dTg has a value corresponding to the peak of NS (−1.0 deg in FIG. 7), dTo has a value corresponding to the peak of PS (0.5 deg in FIG. 4) and eTo becomes a value corresponding to the peak of PS (1.0 deg in FIG. 3). In this case, no corresponding consequent membership function is defined as seen in FIG. 9A, and in this state, no control will be effected. However, a consequent membership function is defined in an adjacent position, i.e., in the position where dTg is NB or PS, and dTo is ZR or PB as seen in FIG. 9A, so that dTg or dTo, when slightly varies, permits such a membership function to serve the purpose. Thus, uncontrollable situation will not occur.

Figure 10:
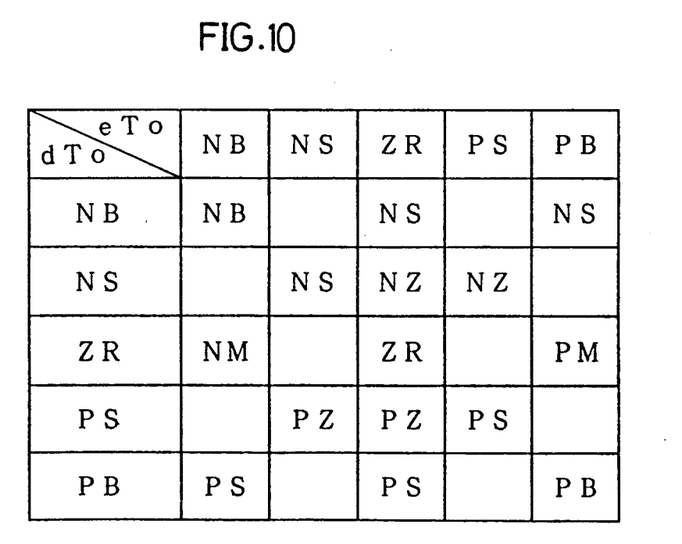
FIG. 10 is a diagram of a rule matrix relating to deviations of cold water outlet temperatures and variations in the cold water outlet temperature.

FIG. 10 shows a rule matrix with respect to the input variable eTo and dTo. In this matrix, five consequent membership functions NS, NZ, ZR, PZ and PS are defined in corresponding relation to all of antecedent membership functions NB, NS, ZR, PS and PB when the input variable eTo is ZR. NZ and PZ are fuzzy labels for membership functions defined between NS and ZR, and between ZR and PS, respectively.

Figure 14:
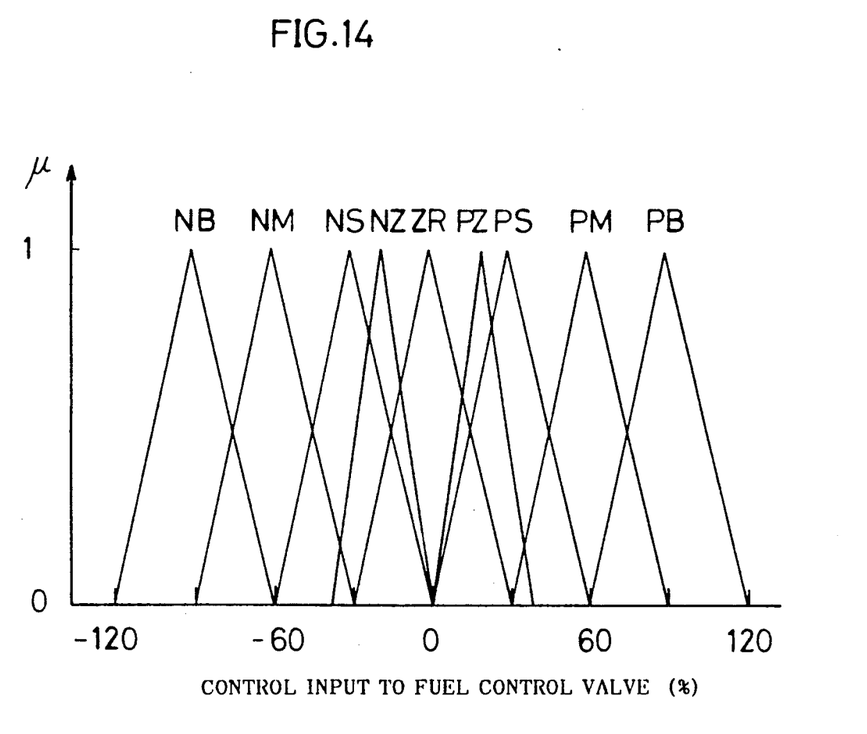
FIG. 14 is a diagram showing consequent membership functions.

These consequent membership functions are defined closely at a reduced interval therebetween, with ZR positioned centrally of the arrangement of functions as seen in FIG. 14.

Consequently, in a state wherein the cold water outlet temperature is approximate to the desired value, fine control is effected, with the eventual result that the cold water outlet temperature is controlled to the desired value with high accuracy.

Figure 11:
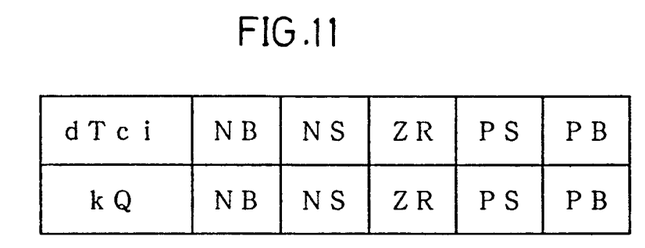
FIG. 11 is a diagram showing rules relating to variations in the cooling water inlet temperature.
Figure 12:
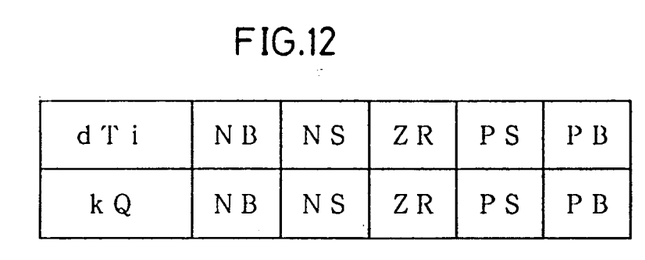
FIG. 12 is a diagram showing rules relating to variations in the cold water inlet temperature.
Figure 13:
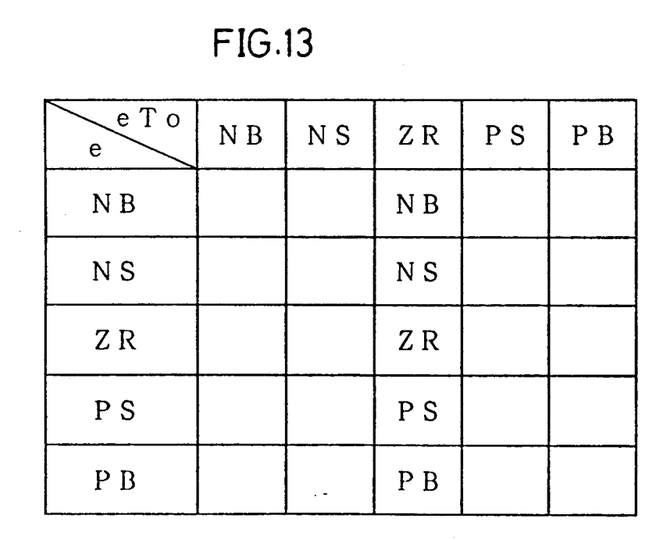
FIG. 13 is a diagram showing rules relating to deviations of cold water outlet temperatures and the average value of deviations of cold water outlet temperatures.

Rules are defined as to dTci in FIG. 11, as to dTi in FIG. 12, and as to e in FIG. 13. Incidentally with respect to e, the rules are defined on condition that eTo is Zr, whereby occurrence of offset is precluded in the stabilized period of control.

Figure 2:
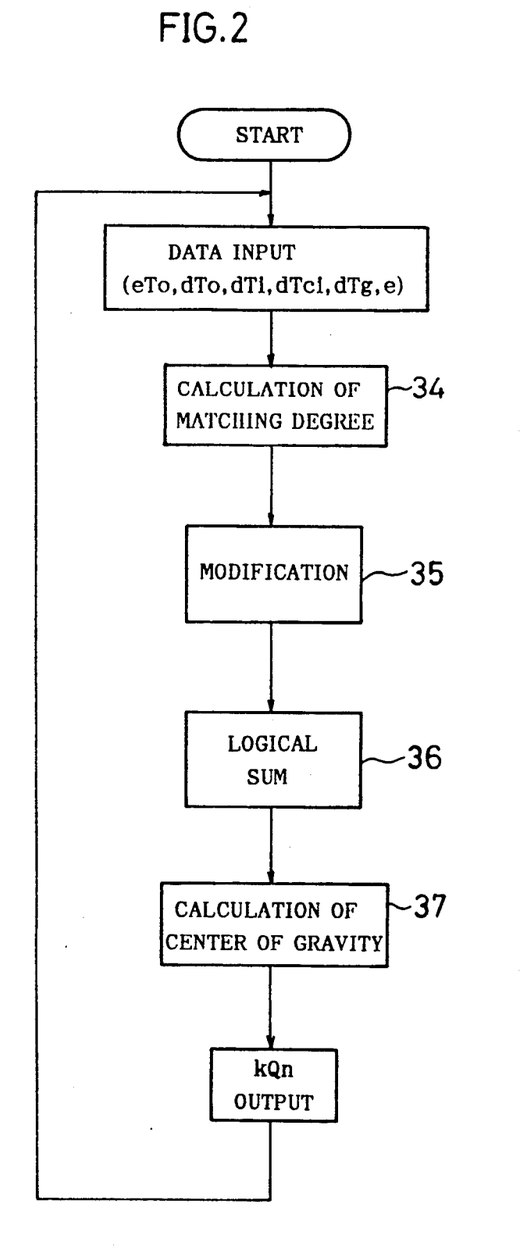
FIG. 2 is a flow chart of fuzzy logic control process.
Figure 3:
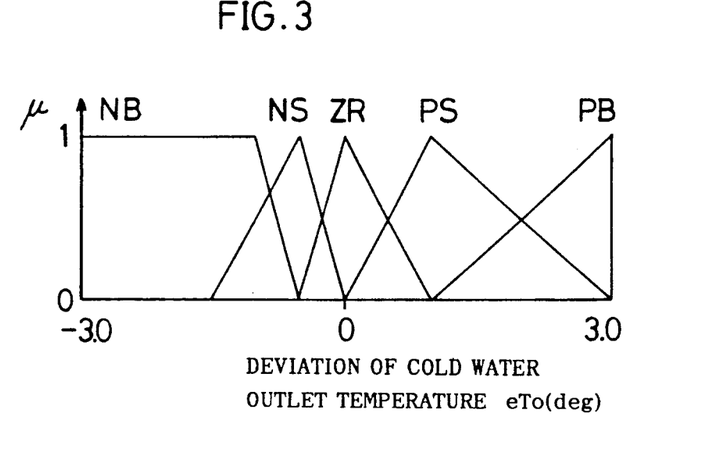
FIG. 3 is a diagram of antecedent membership functions for deviations of cold water outlet temperatures.
Figure 4:
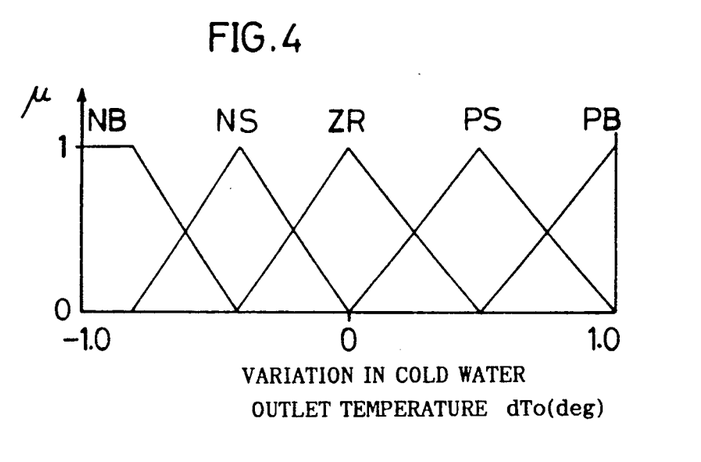
FIG. 4 is a diagram of antecedent membership functions for variations in the cold water outlet temperature.
Figure 5:
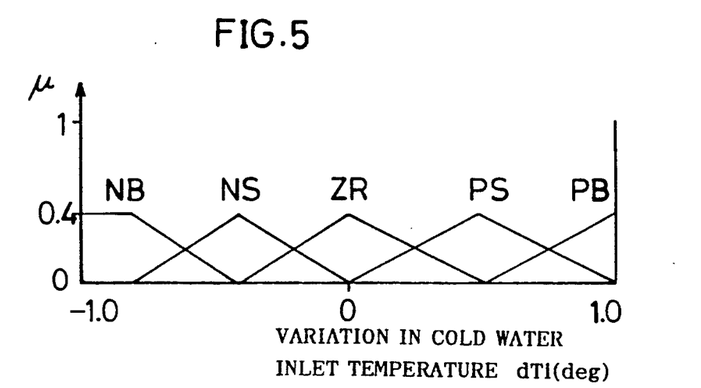
FIG. 5 is a diagram showing antecedent membership functions for variations in the cold water inlet temperature.
Figure 6:
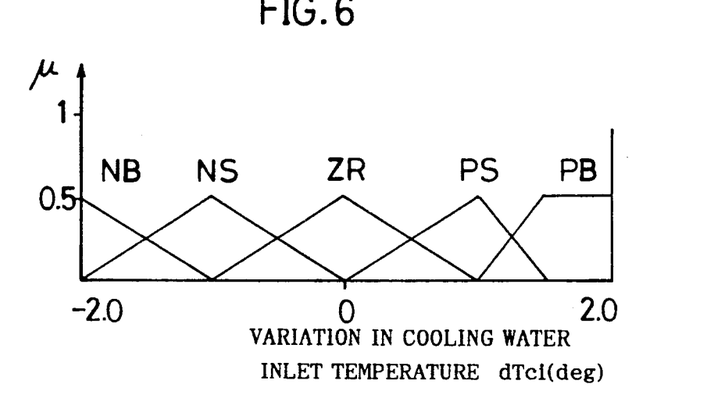
FIG. 6 is a diagram showing antecedent membership functions for variations in the cooling water inlet temperature.
Figure 7:
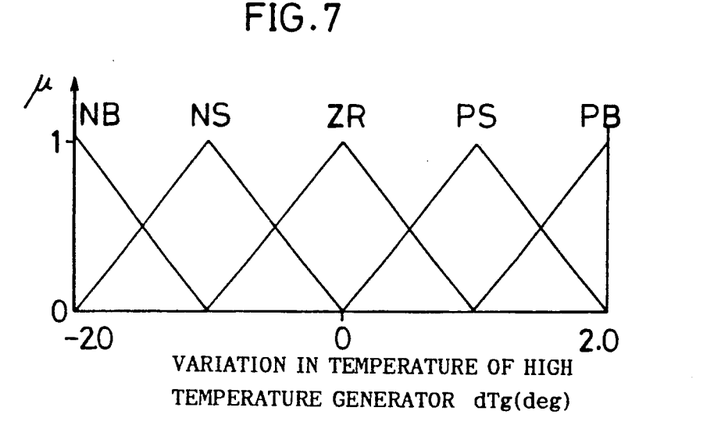
FIG. 7 is a diagram showing antecedent membership functions for variations in the temperature of a high temperature generator.
Figure 8:
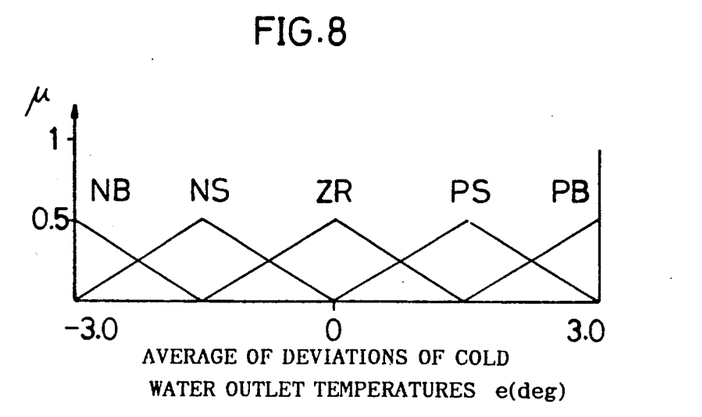
FIG. 8 is a diagram showing antecedent membership functions for the average value of deviations of cold water outlet temperatures.

FIG. 2 shows a sequence of fuzzy logic control procedures to be executed by the fuzzy reasoning processor 27. After accepting the input variables eTo, dTo, dTci, dTi, e and dTg, the processor 27 calculates as indicated at 34 the grades of rules as already stated and illustrated in the drawing.

Next, the processor 27 truncates the consequent membership functions in the rule memory 28 in accordance with the grades to modify the functions as at 35.

The processor 27 thereafter superposes the modified membership functions to determine the logical sum 36, conducts an operation 37 to determine the center of gravity of the resulting function, and feeds the result of operation to the controller 26 as a controlled input kQn to the fuel control valve 17.

The controller 26 calculates new opening degree data $Qn = Qn-1 + kQn$ from the controlled input kQn and the previous opening degree data $Qn-1$ and adjusts the fuel control valve 17 in accordance with the opening degree data Qn.

The control operation described above is repeated every 5 seconds, whereby the cold water outlet temperature is made to respond to the desired value rapidly and to maintain the desired value without involving offset during the stabilized period of control.

The description of the foregoing embodiment is intended for the illustration of the present invention and should not be interpreted as restricting the invention as defined in the appended claims or reducing the scope of the invention. Further the construction of the device of the invention is not limited to that of the embodiment but can of course be modified variously by one skilled in the art within the scope of the invention.

What is claimed is:

1. A control system for an absorption refrigerator comprising an evaporator, absorber, generator and condenser for providing a refrigeration cycle, the control system being adapted to subject the outlet temperature of cold water to fuzzy logic control by adjusting the amount of heating of the generator according to a plurality of fuzzy rules serving as bases for fuzzy reasoning, the fuzzy rules including at least one rule having two antecedent input variables, two membership functions for the two input variables, and consequent membership functions which, when arranged in a matrix in corresponding relation to the two antecedent membership functions, are defined in every other row and every other column of the matrix in a region where at least the two input variables take a positive or negative great value.

2. A control system for an absorption refrigerator comprising an evaporator, absorber, generator, and condenser for providing a refrigeration cycle, the control system being adapted to subject the outlet temperature of cold water to fuzzy logic control by adjusting the amount of heating of the generator, the control system comprising:

first arithmetic means for calculating values of a plurality of input variables for forming fuzzy rules based on a plurality of items of measurement data at least including the cold water outlet temperature, a cold water inlet temperature, a cooling water inlet temperature and the temperature of the generator, memory means having stored therein a plurality of fuzzy rules serving as bases for fuzzy reasoning, second arithmetic means for calculating a control input to approximate the cold water outlet temperature to a desired value by conducting fuzzy reasoning in accordance with the specified rules stored in the memory means based on the values of input variables supplied from the first arithmetic means, and control means for adjusting the amount of heating of the generator in accordance with the control input delivered from the second arithmetic means as an output, the plurality of rules in the memory means including rules having two antecedent input variables, tow membership functions for the two input variables, and consequent membership functions which, when arranged in a matrix in corresponding relation to the two antecedent membership functions, are defined in every other row and ever other column of the matrix in a region where at least the two input variables take a positive or negative great value.

3. A control system as defined in claim 2 wherein the two input variables are the variation in the cold water outlet temperature and the variation in the temperature of the generator, and the consequent membership functions are defined in every other row and every other column of the rule matrix within the entire range of the matrix.

4. A control system as defined in claim 2 wherein one of the input variables is the variation of the cold water outlet temperature from the desired value, and consequent membership functions corresponding to the other input variable are given in the direction of row or column without an interval therebetween at a region where said one input variable is zero or approximately zero, the consequent membership functions being defined closely at a smaller interval as the control input approaches zero.

5. A control system for an absorption refrigerator comprising an evaporator, absorber, generator and condenser for providing a refrigeration cycle, the control system being adapted to subject the outlet temperature of cold water to fuzzy logic control by adjusting the amount of heating of the generator according to fuzzy rules formed by input variables, one of the input variables being the deviation of the cold water outlet temperature from a desired value, another one of the input variables being the average value of deviations of cold water outlet temperatures from the desired value during a specified period in the past, membership functions being defined for the average value of deviations of cold water outlet temperatures during the specified past period on condition that the deviation of cold water outlet temperature is zero or approximately zero.

6. A control system as defined in claim 5 wherein antecedent membership functions for the average value of deviations of cold water outlet temperature during the specified past period are weighted with a value of less than 1.

7. A control system for an absorption refrigerator comprising an evaporator, absorber, generator and condenser for providing a refrigeration cycle, the control system being adapted to subject the output temperature of cold water to fuzzy logic control by adjusting the amount of heating of the generator according to fuzzy rules formed by input variables, antecedent membership functions for one or a plurality of the input variables being weighted according to the degree of influence by the variable on a control input.

8. A control system as defined in claim 7 wherein the input variables include the deviation of the cold water outlet temperature from a desired value, variation in the cold water outlet temperature, variation in a cooling water inlet temperature, variation in a cold water inlet temperature and average value of deviations of cold water outlet temperatures during a specified period in the past, and the antecedent membership functions for the variations in the cooling water inlet temperature and in the cold water inlet temperature and for the average value of deviations are each weighted with a value of less than 1.

* * * * *